United States Patent [19]

Andruet

[11] Patent Number: 5,293,517
[45] Date of Patent: Mar. 8, 1994

[54] CONTROL DEVICE FOR A MOTOR VEHICLE PARKING BRAKE

[76] Inventor: Jean-Claude Andruet, Opio, France

[21] Appl. No.: 859,353

[22] PCT Filed: Nov. 27, 1990

[86] PCT No.: PCT/FR90/00854
§ 371 Date: May 21, 1992
§ 102(e) Date: May 21, 1992

[87] PCT Pub. No.: WO91/08133
PCT Pub. Date: Jun. 13, 1991

[30] Foreign Application Priority Data

Nov. 27, 1989 [FR] France ............... 89 15548

[51] Int. Cl.⁵ ............... B60T 13/74; F16D 65/34
[52] U.S. Cl. ............... 318/266; 318/362; 318/468; 307/9.1
[58] Field of Search ............... 307/9.1; 318/264, 265, 318/266, 286, 466, 467, 468, 362, 364, 369, 372, 139; 188/156, 157, 158, 159, 160, 161, 162

[56] References Cited

U.S. PATENT DOCUMENTS

| | | | |
|---|---|---|---|
| 3,875,820 | 4/1975 | Morden | 74/512 |
| 4,941,553 | 7/1990 | Harrison | 188/156 |
| 4,991,699 | 2/1991 | Hiraiwa et al. | 192/1.34 |
| 5,004,061 | 4/1991 | Audruet | 180/65.5 |

FOREIGN PATENT DOCUMENTS 0345123 12/1989 European Pat. Off.
3238196 4/1984 Fed. Rep. of Germany.
716371 12/1931 France.

*Primary Examiner*—Bentsu Ro
*Attorney, Agent, or Firm*—Cushman, Darby & Cushman

[57] ABSTRACT

A control device for a parking brake for a vehicle includes an electric motor which rotates a crank to activate the parking brake with the provision of a disk having two concentric conductive tracks which are interrupted by an insulating space; the disk is rotated by the drive shaft to control the supply of current for driving the electric motor.

13 Claims, 4 Drawing Sheets

CONTROL DEVICE FOR A MOTOR VEHICLE PARKING BRAKE

FIELD OF THE INVENTION

The invention relates to a control device for a parking brake for a motor vehicle.

The invention concerns more particularly, but not exclusively, such a control device for a golf buggy, in particular of the kind aimed at by the Patent Application FR 88 07243 (FR-A-2 631 902) filed on the 31st May, 1988 in the Applicant's name.

The object of the invention is primarily to improve the efficiency of the parking brake.

SUMMARY OF THE INVENTION

According to the invention, the control device for the parking brake is characterized in that it includes motor means capable of actuating the parking brake and control means for the starting, in particular, the automatic starting of the motor means.

Preferably, the control device includes a rotary crank capable of driving a mechanical linkage acting on the parking brake, the motor means being capable of ensuring the rotation of the crank from an "engagement" position to a "disengagement" position and vice versa.

Preferably, the engagement and disengagement positions of the crank are diametrically opposed.

The motor means capable of actuating the parking brake and in particular the crank are advantageously constituted by an electric motor, optionally combined with a reducing gear that is, in particular, capable of driving the crank.

A device including a disk provided with two concentric tracks whereof at least one is open, and comprises an insulating space separating its two ends, is fixed on a drive shaft of the crank and is capable of cooperating with brushes coming into contact with these tracks to ensure the electric power supply for the motor so as to produce the stopping of the shaft and of the crank in a given position and to permit the movement of this crank only to pass from the engaged position to the disengaged position, or vice versa.

According to an advantageous mode of embodiment, in particular for a golf buggy, the motor means of the parking brake are capable of acting on a normal braking device, the mechanical linkage between the motor means of the parking brake and the normal braking device being ensured by a loss of motion device making it possible to retain a conventional actuation of the normal braking device by acting on the brake pedal.

The engaging or disengaging actuation can be manual, in particular, by means of push buttons and/or contacts that are capable of starting the motor means for actuating the parking brake in the engagement or disengagement direction.

As a variant, the actuation of engaging the parking brake can be manual, whilst provision is made for an automatic disengagement actuation during action on the accelerator pedal.

Advantageously, provision is made for an automatic actuation of the engagement of the parking brake in response to the absence of any action on the accelerator pedal; provision may be made for an adjustable time lag, in particular of the order of at least one second, for actuating the engagement of the parking brake after the action on the accelerator pedal has ceased.

In the case of a vehicle, in particular a golf buggy which comprises electric drive motors powered by a chopped current, the control device may includes means for controlling a control relay sensing the conductive or blocked state of a transistor energizing the electric drive motors.

Provision may be made for means sensing the speed of motion of the vehicle capable of only permitting the automatic engagement of the parking brake when the vehicle is stationary, or when its speed is less than a predetermined value.

Apart from the arrangements set out above, the invention consists of a certain number of other arrangements which will be discussed in greater detail below in conjunction with particular modes of embodiment described with reference to the attached drawings, but which are in no way restrictive.

BRIEF DESCRIPTION OF THE DRAWING

Finally.

DETAILED DESCRIPTION OF THE INVENTION

Figure 1:
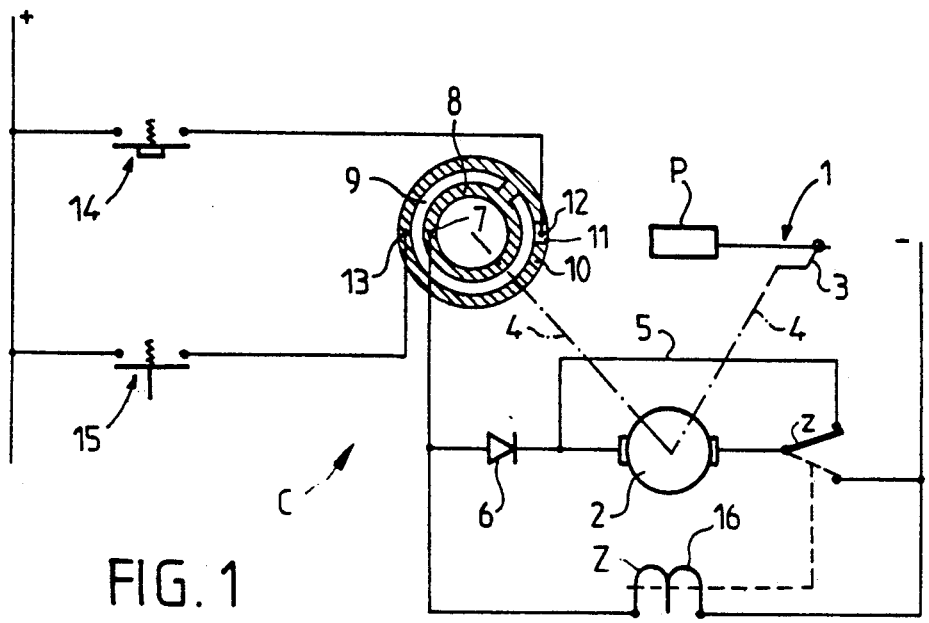
FIG. 1 of these drawings is an electric circuit diagram of a parking brake control device according to the invention, with manual engagement and automatic disengagement.

Referring to FIG. 1 of the drawings, there may be seen a parking brake control device C for a motor vehicle (not represented). Only a mechanical linkage 1 has been schematically shown which allows the schematically represented parking brake P to be acted on. The control device C includes an electric motor 2 capable of actuating the parking brake P. For this purpose, a crank 3 is fixed on the shaft 4 of the motor 2 or of a reducing gear (not shown) that is driven by the motor 2. The crank 3 drives the rod 1 and can pass from the position in a solid line shown in FIG. 1 to a diametrically opposed position. The position in a solid line may correspond to the engagement of the parking brake, whilst the diametrically opposite position corresponds to the disengaged position.

The passing of the crank 3 from one position to the other is ensured by a one half turn rotation of the shaft 4, either always in the same direction, or in the opposite direction.

The electric motor 2 is of the direct current type. A terminal of the motor 2 is connected to the—power supply line via the operative position of a contact z of a relay Z. In its rest position represented in a solid line in FIG. 1, the contact z short-circuits the motor in itself by means of a connection 5 to the other terminal of the motor. This other terminal of the motor is connected to the cathode of a diode 6 whose anode is connected to a contact 7 capable of being in a permanent electrical connection with a conductive annular inner track 8 that is closed in itself. This track 8 is provided concentrically on an insulating disk 9 fixed to the shaft 4. This disk 9 forms a cam which actuates the stopping of the motor 2 and of the shaft 4 in the engaged or disengaged position.

The disk 9 comprises another, outer conductive track 10 which is open, concentric with the track 8 and electrically connected to the latter, the two adjoining ends of this track 10 being separated by an insulating space 11 forming a non-conductive "hole". Provision is made for two diametrically opposed contacts 12, 13 to come to bear on the annular zone of the track 10.

The contact 12 corresponding to the engagement actuation is electrically connected to a terminal of a push button 14, whose other terminal is connected to the + electric power supply line.

The contact 13 assigned to the disengagement is connected to a terminal of a contact 15 whose other terminal is connected to the + line.

The closing of the contact 15 is actuated by the accelerator pedal (not represented) of the motor vehicle. When the driver presses on this pedal, he produces the closing of the contact 15.

The control winding 16 of the relay Z is disposed between the contact 7 and the − power supply line.

The operation of the control device of FIG. 1 is as follows.

It will be assumed that the control device is in the "disengaged" position of the parking brake, that is to say, that the crank 3 occupies a position diametrically opposed to that of FIG. 1, as does the insulating space 11 which is situated under the contact 13.

When the driver wishes to obtain the engagement of the parking brake, it suffices for him to depress the push button 14 for a minimum period, for the shaft 4 to complete a half turn, that is to say, for approximately ½ second. The relay Z is energized because the connection is ensured between the + line and the − line by the contact 12, the track 10 which, in the disengaged position is situated under the contact 12, the track 8, the contact 7 and the connection between the winding 16 and this contact 7. The relay Z causes the contact z to pass from the rest position (a solid line) to the operative position (dashes), which ensures the energizing of the motor 2 which starts to turn, while simultaneously driving the crank 3 and the disk 9.

When the shaft 4 has completed a ½ turn, the crank 3 will have displaced the rod 1 into the engagement position (the position in FIG. 1). Simultaneously, the disk 9 will have turned relative to the contacts 7, 12 and 13 and the insulating space 11 will be situated under the contact 12, while the contact 13 will bear on the track 10. The arrival of the insulating space 11 under the contact 12 cuts the power supply to the motor 2, which stops in the engaged position.

Since the relay Z is no longer excited, the contact z returns to its rest position shown in a solid line, which ensures the short-circuiting of the motor 2 and its precise stopping.

When the driver presses on the accelerator pedal, the contact 15 is closed and ensures the power supply to the coil 16 of the relay Z via the contact 13 which at this moment, is in contact with the track 10. The motor 2 will again complete a ½ turn as explained above, causing the crank 3 to pass from the engagement position to the disengagement position. The release of the parking brake is produced approximately ½ a second after the accelerator pedal has been pressed.

Figure 2:
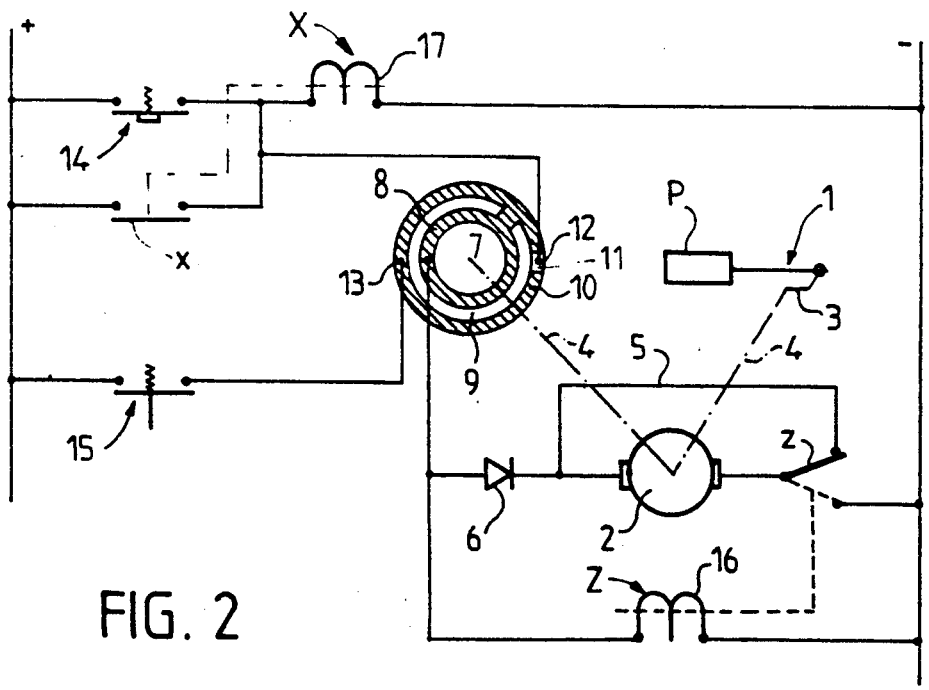
FIG. 2 is a circuit diagram illustrating a variant of the embodiment of FIG. 1, still with manual engagement and automatic disengagement.

FIG. 2 shows a control device of the same kind as that of FIG. 1. However, the control push button 14 is combined with a relay X intended to ensure that the power supply is maintained in the case where the push button 14 has been released before the crank 3 has completed its ½ turn.

The relay X includes a winding 17 disposed between the − power supply line and the contact 12. This relay X includes a normally open contact x disposed in parallel with the push button 14 between the + line and the contact 12.

The operation is similar to that described with reference to FIG. 1. However, an action, even a very rapid action on the push button 14, suffices to produce the locking of the parking brake since this action produces the closing of the normally open contact x by the relay X, which contact maintains the power supply to the motor 2 even if the push button 14 is released.

Figure 3:
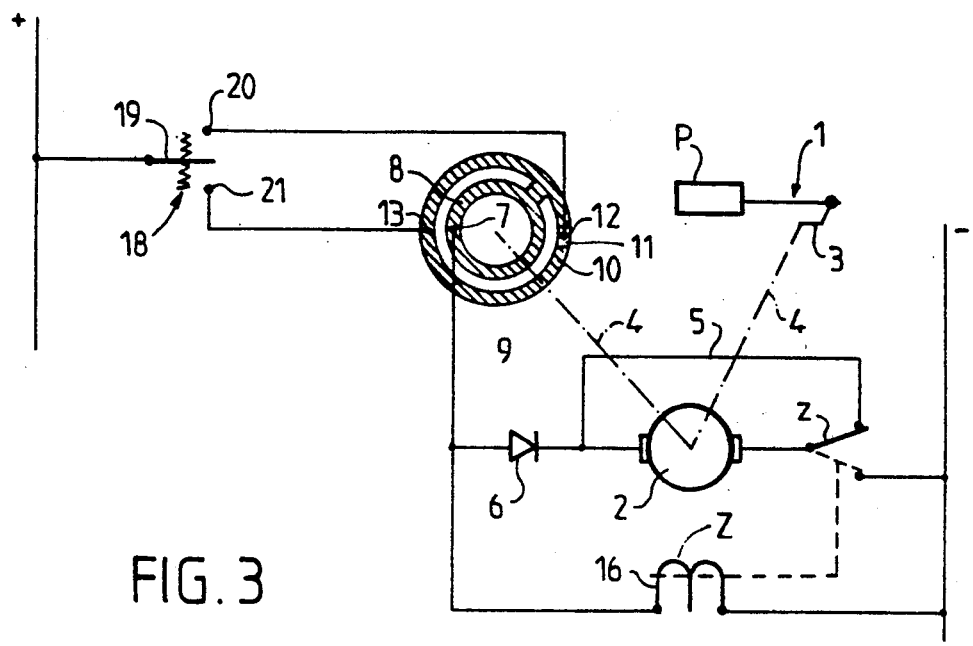
FIG. 3 is a another circuit diagram of a parking brake control device according to the invention with manual engagement and disengagement.

FIG. 3 is a circuit diagram of the control device similar to that of FIGS. 1 and 2 wherein, however, the engagement and disengagement actuation is manual and is ensured by means of a switch 18 including a bar 19, connected to the + line, which can be placed either into the rest position represented in a solid line in FIG. 3, or into an operative position where it is in contact with a contact piece 20 connected to the contact 12 or with a contact piece 21 connected to the contact 13.

Preferably, provision is made for resilient restoring means for returning the bar 19 into its median position where it is not in contact with any contact piece.

The manual displacement of the bar 19 so as to place it into contact with the contact piece 20 and maintaining this contact for approximately a ½ second, makes it possible to obtain the locking of the parking brake.

The disengagement is obtained by manually displacing the bar 19 to bring it into contact with the contact piece 21 and maintaining it there for approximately a ½ second in this position.

To avoid having to hold the bar 19 for a time sufficient for the engagement or disengagement, provision may be made for self-holding relays for each of the contact pieces 20, 21, similar to the relays X of FIG. 2.

Figure 4:
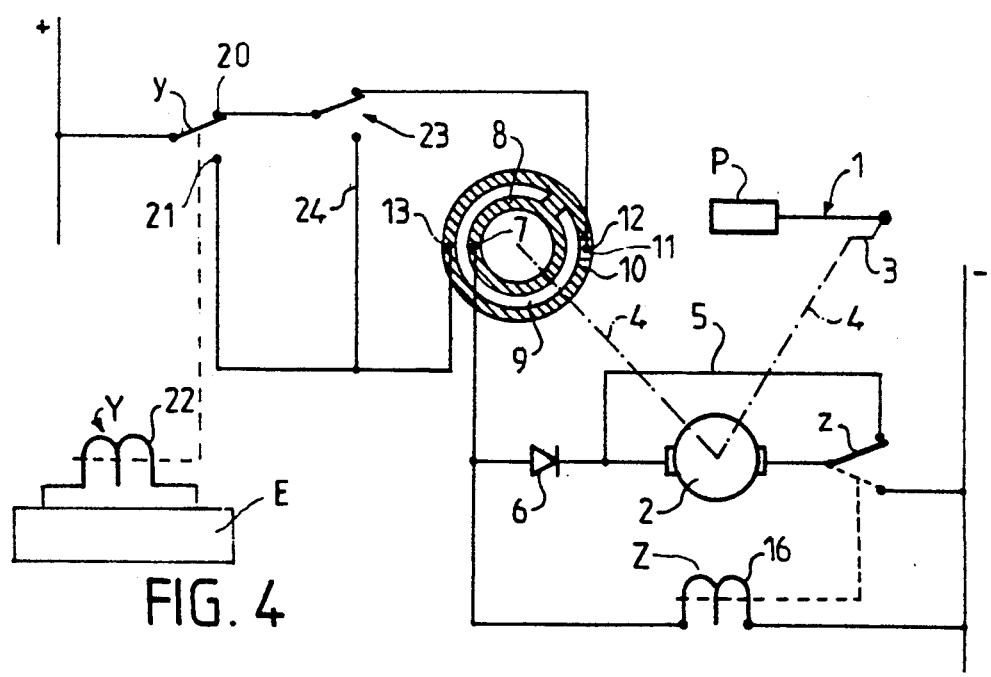
FIG. 4 is a circuit diagram of a variant of the embodiment of the parking brake control device with automatic engagement and disengagement.

The circuit diagram of the control device of FIG. 4 is largely similar to that of FIG. 3. However, the manual switch 18 has been replaced by a relay Y, whose coil 22 is controlled by an independent circuit E. A movable bar y of this relay replaces the bar 19 of FIG. 3.

A safety switch 23 is mounted in the electric line connecting the terminal 20 of the bar y to the contact 12. This switch 23 may assume the position represented in a solid line in FIG. 4 where it ensures the connection between the terminal of the bar y and the contact 12. The switch 23 may assume a second position where it connects the terminal 20 of the bar y to a line 24 connected to the contact 13, allowing the parking brake to be disengaged.

Figure 5:
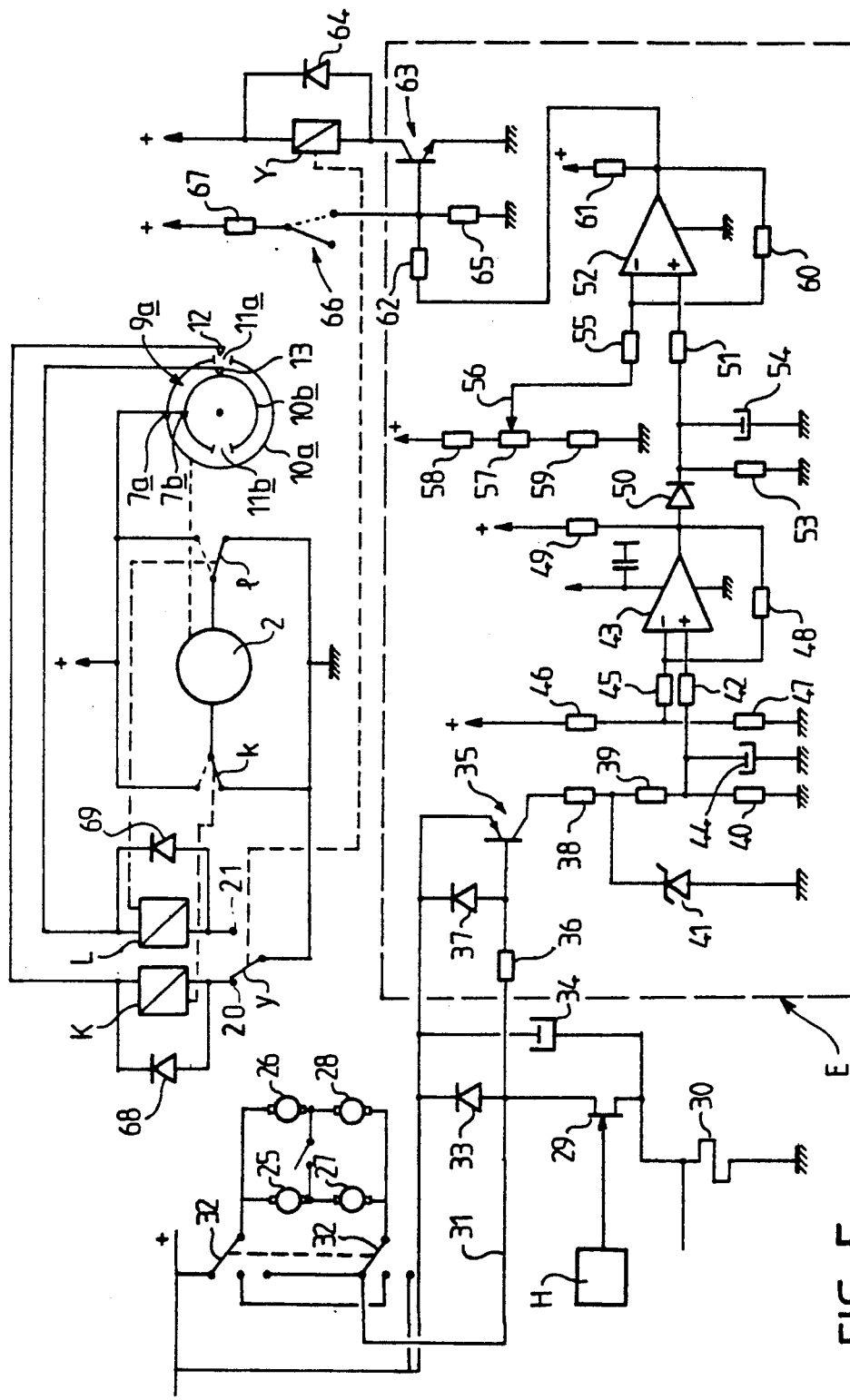
FIG. 5 is a more detailed circuit diagram of the control device of FIG. 4.

Referring to FIG. 5, the detailed electric circuit diagram may be seen of a control device with automatic engagement and disengagement of the type described with reference to FIG. 4.

The circuit diagram of FIG. 5 is provided for a parking brake control device in a golf buggy driven by an electric motor. Preferably, four electric motors 25, 26, 27, 28 are associated with each of the four wheels of the vehicle in accordance with the FR-A-2 631 902.

The flow of the current in the drive motors 25-28 is controlled by a set of MOS transistors 29, disposed in parallel, only one of which has been shown.

Each transistor 29, for example of the N channel type, has its source earthed, with the possible interposition of a resistor 30 (shunt) and its drain connected to an electric line 31 intended to be connected to one of the terminals of the motors 25-28 via a switch 32.

The other terminal of each of the motors 25-28 is intended to be connected to the + power line via another contact of the same switch 32.

It will be immediately understood, as has incidentally been explained in the FR-A-2 631 902, that when the switch 32 is in one of its operative positions ensuring the connection of the + line with one of the terminals of the motors 25-28, these motors will be energized when the transistors 29 are conductive and will not be energized when the transistors 29 are blocked.

Provision is made for means H, for example, of the type described in the FR-A-2 631 902 for controlling the voltage of the grid of the transistors 29 and cause these transistors to be conductive during variable and adjustable periods of time. Thus the means H ensure an electric power supply for the drive motors 25-28 by chopping of the current; the mean intensity passing through the drive motors and hence the instantaneous available power will vary in accordance with the chopping rate (or cyclic ratio). The adjustment of this chopping rate is ensured by action on the accelerator pedal; the more the accelerator pedal is depressed, the longer the period of conduction of the transistors 29, and vice versa.

Free wheel diodes 33, of which only one has been represented, are disposed in parallel, with their anodes connected to the drain of the transistors 29, and hence to the corresponding terminal of the drive motors 25-28; the cathode of these diodes 33 is connected to the + line. A capacitor 34 is disposed between the cathode of the diodes 33 and the source of the transistors 29.

The means described above with reference to FIG. 5 were already provided in the FR-A-2 631 902.

The means described below are specific to the invention and to the control of the parking brake.

In this FIG. 5, the electric motor for controlling the parking brake has been designated by the reference numeral 2 as in the preceding Figures. The relay Y will also be found again with its bar y already described with reference to FIG. 4.

The automatic control of the relay Y is obtained by means of the circuit E described below.

At its input, the circuit E includes a transistor 35, for example of the PNP type, whose emitter is connected to the cathode of the diode 33. The base of the transistor 35 is connected via a resistor 36 to the anode of the diode 33. A diode 37 is disposed between the base and the emitter of the transistor 35. The anode of the diode 37 is connected to the base of the transistor 35, while the cathode of the diode 37 is connected to the emitter.

The collector of the transistor 35 is earthed via several resistors 38, 39, 40 disposed in series.

A ZENER diode 41 is disposed between earth and a point situated between the resistors 38 and 39. The ZENER diode 41 is provided to limit the voltage between this point and earth to a predetermined value, for example, 17 V.

A point situated between these resistors 39 and 40 is connected via a resistor 42 to the non-reversing input of an operational amplifier 43 disposed as a comparator; a capacitor 44 is disposed between this midpoint of the resistors 39, 40 and earth.

The reversing input of the amplifier 43 is connected by a resistor 45 to a midpoint of a voltage divider formed by two resistors 46, 47 disposed in series between a + terminal at a specified voltage (for example 17 V) and earth. A reference voltage value is thus passed to the reversing input of the amplifier 43. The output of this amplifier is connected to the reversing input by a resistor 48. The output of the amplifier 43 is also connected by a resistor 49 to the + terminal of the source of the reference voltage (+17 V for example) and to the anode of a diode 50. The cathode of this diode is connected by a resistor 51 to a non-reversing input of an operational amplifier 52 also disposed as a comparator.

A resistor 53 and a capacitor 54 are disposed in parallel between the cathode of the diode 50 and earth. These two elements 53, 54 form a time delay circuit.

The reversing input of the amplifier 52 is connected by a resistor 55 to the slider 56 of a potentiometer 57. A terminal of this potentiometer is connected to the + terminal of the reference voltage (+17 V) by a resistor 58. The other terminal of the potentiometer is earthed via a resistor 59.

The output of the amplifier 52 is connected to the reversing input by a resistor 60. The output of the amplifier 52 is, moreover, connected by a resistor 61 to the + terminal of the source of the reference voltage (+17 V for example).

The output of the amplifier 52 is finally connected via a resistor 62 to the base of a transistor 63, for example, of the NPN type. The emitter of this transistor 63 is earthed, whilst the collector is connected to a terminal of the coil of the relay Y, the other terminal of this coil being connected to the + terminal of a direct voltage source, for example, at +24 V. A diode 64 is mounted in parallel at the terminals of the coil of the Y, the cathode of this diode being connected to the + terminal, and the anode being connected to the collector of the transistor 63.

A resistor 65 is disposed between the base of the transistor 63 and earth.

Provision is made for a switch 66 to permit automatic or manual operation. The position of the switch represented in a solid line in FIG. 5 corresponds to the automatic operation, the connection between the +24 V terminal and the base of the transistor 63 via the resistor 67 being cut.

When the switch 66 is rocked into the position represented in dashes, the connection between the base of the transistor 63 and the + terminal via the resistor 67 is established. The transistor 63 is then made permanently conductive, which ensures the energizing of the coil Y and the rocking of the contact y producing the disengagement of the parking brake.

The pivoting terminal of the contact y is earthed. The terminal 20 of the relay Y whereon there bears the contact Y at rest (position in a solid line in FIG. 5) is connected to the terminal of a coil of an electromagnetic relay K capable of actuating the change-over of a contact k between a rest position represented in a solid line in FIG. 5 and an operative position represented in dashes. The pivoting terminal of the contact K is connected to a terminal of the motor 2; the terminal whereon the contact k comes to bear when at rest is earthed; the other terminal whereon the contact k comes to bear in the operative position is connected to the + terminal of the power supply source (+24 V, for example).

A diode 68 is disposed between the terminals of the coil of the relay K, the anode of this diode being connected to the terminal of the coil connected to the contact y, the cathode being connected to the other terminal which is itself connected to the contact 12 described above and capable of cooperating with the conductive track 10a provided on a disk 9a driven in rotation by the motor 2. The outer track 10a is open and includes between its two ends an insulating space 11a similar to the space 11 of FIGS. 1 to 4.

Provision is made within the track 10a for a second conductive track 10b which is concentric with the latter. This second track 10b is also open and includes between its ends an insulating space 11b diametrically opposed to the space 11a. The contact 13, described above, bears on the disk 9a in the annular zone of this track 10b. The contact 7 of FIGS. 1 to 4 is replaced by a double contact 7a, 7b capable of bearing simultaneously on the track 10a and the track 10b; this double contact 7a, 7b is offset for example, by 90°, relative to the contacts 12 and 13 which have the same angular position.

The contact 13 is connected to a terminal of a coil of an electromagnetic relay L; the other terminal of this coil is connected to the terminal 21 whereon the contact y comes to bear in the operative position. A diode 69 is mounted between the terminals of the coil of the relay L in a way similar to the diode 68 for the coil of K. A contact l capable of changing between a rest position (represented in a solid line) and an operative position (represented in dashes) is controlled by the coil of L. The pivoting terminal of this contact L is connected to the terminal of the motor 2 opposite to that connected to the contact k. The terminal whereon the contact l bears at rest, is earthed; the other terminal whereon the contact l bears in the operative position is connected to the + terminal (+24 V for example). It will thus be seen that the contacts k and l short-circuit the motor in itself in the rest position, which permits precise stopping.

The contacts 7a, 7b are connected to the operative terminal of the contacts k and l as well as to the + terminal of the power supply source (+24 V).

The operation of the control device of FIG. 5 is as follows.

When the driver does not depress the accelerator pedal, in particular when the vehicle is stationary, the transistor 29 is blocked and the voltage at the drain of this transistor, as well as at the anode of the diode 33 is equal to that of the + terminal of the power supply source, the electrical connection between the drain and the + line being ensured by the windings of the motors 25-28. The transistor 35 is blocked and does not allow any current to pass.

The result is that the potential of the point comprised between the resistors 39 and 40 has a low value, near to 0. The output voltage of the amplifier 43, as well as the output voltage of the amplifier 52 are at the low level. The result is that the transistor 63 is not conductive (blocked state), so that the coil of the relay Y is not energized and the contact y is in its rest position.

The shaft of the motor 2 and the cam 9a remain in the position represented in FIG. 5 corresponding to the engagement of the parking brake, in which position the contact 12 bears on the insulating space 11a. The coils of the relays K and L are not energized and the contacts k and l remain in their rest position.

When the accelerator pedal is depressed, the transistor 29 becomes conductive according to a chopping rate depending on the position of the accelerator pedal. The drive motors 25-28 are supplied with electric current and turn. The line 31 will have a lower voltage than that of the + terminal of the power supply source. The same applies to the base of the transistor 35 which is polarized in the passing direction and becomes conductive. A current will circulate in the series of the resistors 38, 39 and 40.

The voltage of the midpoint comprised between the resistors 39 and 40 will increase. When this voltage is sufficient, the amplifier-comparator 43 changes over and its output passes to the high level. The capacitor 54 will be rapidly charged through the passing diode 50.

When the voltage at the terminals of the capacitor 54 reaches a sufficiently high value, the amplifier-comparator 52 changes over in turn and its output passes to the high level, which renders the transistor 63 conductive and ensures the energizing of the coil of the relay Y and hence its excitation.

The result is that the contact y passes from the rest position to its operative position (in dashes in FIG. 5). The coil of the relay L is then energized via the contact 13 of the track 10b, the contact 7b and the connection between this contact and the + terminal. The contact l will pass to its operative position ensuring the energization of the motor 2, which will turn while driving the disk 9a, until the insulating space 11b arrives under the contact 13, that is to say, until the disk 9a has completed a half turn.

The disengagement of the parking brake is then obtained, and since the power supply to the motor 2 is stopped, the disk 9a is stopped in the position that is diametrically opposed to that represented in FIG. 5.

The coil of the relay L is no longer excited and the contact l returns to its rest position (a solid line).

When the accelerator pedal is again released and the transistor is blocked, the voltage on the point comprised between the resistor 39 and 40 disappears. The output of the comparator 43 again passes to the low state (0 V). The capacitor 54 is discharged through the resistor 53, setting off the time delay for the engagement of the brake by hand.

When the voltage at the terminals of the capacitor 54 falls below a comparison value adjustable by the potentiometer 57, the output of the comparator 52 changes over and passes to its low state actuating the blocking of the transistor 63. The coil of the relay Y is no longer energized and the contact y passes into its rest position (a solid line).

Since at this moment, the disk 9a occupies a position diametrically opposed to that represented in FIG. 5, the contact 12 bears on the track 10a which ensures that the coil of the relay K is energized. The contact k changes over into its operative position, which ensures that the motor 2 is energized, which turns while driving the disk 9a.

The rotational motion continues until the disk 9a has completed a half turn to regain the position shown in FIG. 5 where the insulating space 11a is located under the contact 12.

The power supply to the motor 2 ceases and the motor stops, the contact k returning to its rest position. The parking brake is engaged.

At no time is a short circuit possible in the power supply, even is the relays K and L were to remain stuck.

Figure 6:
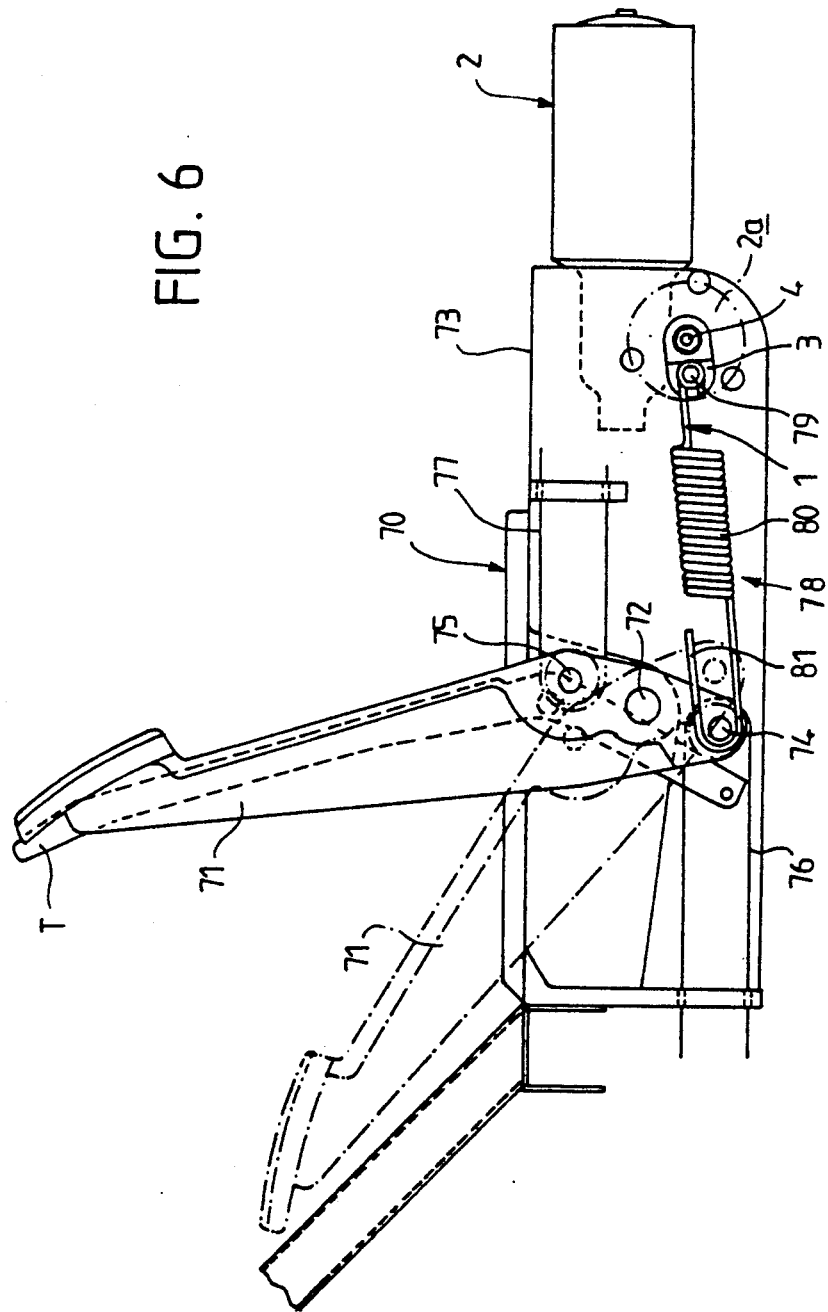
FIG. 6 is an elevational view of a front portion of a golf buggy fitted with a parking brake control device according to the invention.

Referring to FIG. 6, one may see an embodiment of a parking brake control device according to the invention in a golf buggy. Only a portion of the chassis of the vehicle has been represented, this portion being situated just ahead of the driver's seat (not represented).

A conventional brake pedal 71 is articulated round a transverse horizontal pin 72 carried in a low portion of the chassis 70 below the floor 73 of the vehicle. The low portion of the pedal situated below this floor 73 is provided on both sides of the pin 72 with parallel shafts 74, 75 capable of serving as trunnions for the pulleys whereon there are respectively wound the traction cables 76, 77 capable of respectively actuating the brakes (not represented) provided on the front and rear wheels. Rotation of the pedal 71 in the anticlockwise direction round the pin 72 so as to pass from the raised position (in a solid line in FIG. 6) to the depressed position shown in dots and dashes in this FIG. 6, produces a simultaneous pull on the cables 76 and 77, and hence the engagement of the front and rear brakes.

The parking brake control device is installed under the floor 73, slightly behind the pin 72. The electric motor 2 referred to above is fixed to the chassis 70. The motor 2 is generally combined with a reducing gear 2a so that the shaft of the motor 2 is orientated parallel to the longitudinal direction of the chassis 70, whilst the shaft 4 of the reducing gear orthogonal to that of the motor, is orientated transversely.

The crank 3 for actuating the parking brake is fixed angularly at the end of the shaft 4 of the reducing gear.

The braking means of the parking brake are identical with the normal braking device and the crank 3 is capable of exerting a pull on the cables 76 and 77, by means of the bottom part of the pedal 71.

Provision is made for a mechanical linkage by a loss of motion device 78 between the crank 3 and a portion of the shaft 74 which projects relative to the pedal 71. The crank 3 is provided with a trunnion 79 that is eccentric relative to the shaft 4. The device 78 includes a helical tension spring 80 whose one end includes a straight extension which forms the connecting rod 1. The end of this rod 1 forms a loop articulated on the trunnion 79.

The other end of the spring 80 is formed by a straight section bent back along a relatively long loop 81. This loop 81 is capable of receiving in its concavity a projecting end of the shaft 74. The sides of the loop 81 are sufficiently long for the shaft 74 to remain within this loop when the pedal 71 is completely depressed and when the crank 3 occupies the position shown in a solid line in FIG. 6, corresponding to the disengagement of the parking brake. When the engagement of the parking brake is actuated, the crank 3 completes a half turn and the trunnion 79 comes to assume a position diametrically opposed to that represented in FIG. 6 relative to the shaft 4.

An optimum adjustment of the length of the spring 80 allows the top stop of the pedal 71 to be defined.

The spring 80 makes it, moreover, possible to cushion the pedal 71 when being released.

The characteristics of the spring 80 make it possible to ensure a certain braking force and compensate the travel (greater or lesser clearance for the actuation).

The disk 9 with a conductive track of FIGS. 1 to 4 is fixed to the shaft 4 of the crank. The spring 81 transmits the tractive force of the crank 3 while damping any shocks to the shaft 74, which moves back to the position shown in dots and dashes, the pedal 71 being driven in an anticlockwise rotational motion round the pin 72. The trunnion 75 is displaced forward and the braking device is actuated.

The accelerator pedal T has been represented in its rest position in FIG. 6.

The driver keeps the conventional use of the normal braking device by action on the pedal 71, whilst the automatic control device of the parking brake becomes operative when the vehicle is stopped and the accelerator pedal is released.

Provision may be made for means for sensing the speed of motion of the vehicle which are capable of only permitting the automatic engagement of the parking brake when the vehicle has stopped for a certain time, for example, one second, or when its speed is less than that of a predetermined value. Such means could, for example, sense the voltage at the terminals of the drive motors 25-28; when the vehicle continues to advance in a freewheeling mode, the presence of a voltage due to the rotation of the motors 25-28 operating as generators, would make it possible to prevent the engagement of the parking brake until the vehicle has completely stopped and the accelerator pedal is raised.

Provision could also be made for a seat transducer disposed in parallel with the preceding one, sensing the driver's weight. The engagement of the parking brake would only be actuated when the driver is no longer seated on his seat.

Provision may be made for a manual parking brake, in parallel with the control device of the invention.

It should be noted that the invention concerns a parking brake control device which can be applied to any motor vehicle, although a golf buggy has been more particularly considered in the above description.

The motor means actuating the parking brake could be constituted by a pneumatic jack, a hydraulic jack or any other means equivalent to the electric motor 2.

It is clear that the embodiment of FIG. 6 which concerns a braking device by means of a cable is not restrictive. In the case of hydraulic braking, the pedal 71 of FIG. 6, and hence the crank 3, would act on the master cylinder.

I claim:

1. A device operating a parking brake for a vehicle including electric motor means for actuating the brake, said motor means having a drive shaft, said device including control means for controlling the operation of said motor means, said control means including a rotary crank drivingly connected to a linkage member for actuating the brake, said crank being drivingly connected by said drive shaft to said motor means for rotation thereof between an engagment position and a disengagment position, said device including a disk having two concentric, conductive tracks, one of said conductive tracks being interrupted by an insulating space, said disk being rotatably driven by said drive shaft, said device including brush means positioned to engage said tracks to provide an interruptable current path for electric current for driving said motor means to effect movement of said crank between said engagment and disengagment positions.

2. The device of claim 1 wherein the engagement and disengagement positions of said crank are diametrically opposed.

3. The device of claim 1 wherein said crank is fixed on said drive shaft.

4. The device of claim 3 wherein said motor means includes a reducing gear.

5. The device of claim 1 wherein one of said tracks is an inner annular, closed track and the other of said tracks is an outer, open track having opposite ends adjacent to and separated by said insulating space, said tracks being electrically connected, said device including two diametrically spaced contacts bearing on said outer track, one of said contacts corresponding to said engagement position and the other of said contacts corresponding to said disengagement position.

6. The device of claim 1 wherein one of said tracks is an inner annular, open track and the other of said tracks is an outer, open track, said one track having opposite ends adjacent to and separated by said insulating space, said other track having opposite ends adjacent to and separated by another insulating space, said insulating spaces of each said tracks being located diametrically opposite one another on said disk, said tracks being electrically connected, said device including two contacts bearing on said tracks each having the same angular position relative to said disk, a double contact being provided to engage both of said tracks simultaneously.

7. The device as claimed in claim 1 wherein manual means are provided for the actuation of the brake corresponding to the engagment and disengagement positions, said manual means comprising a push button for starting said motor means to move the brake from one of the positions to the other of said positions.

8. The device as claimed in claim 7 wherein an accelerator means is provided and said device includes an automatic control element for disengagement of the brake when said accelerator means is actuated.

9. The device as claimed in claim 1 wherein the vehicle is a golf cart having a pedal brake for slowing and stopping the cart, said motor means engaging said pedal brake through said linkage member and a lost motion member allowing normal actuation of said pedal brake.

10. The device as claimed in claim 9 wherein said lost motion member includes a helical tension spring having a straight extension forming a connecting rod, said crank having a trunnion on which is pivoted a portion of said rod, said spring having an end opposite said extension, said end of said spring having another extension bent to form a loop receiving a projecting end of a shaft operatively connected to said pedal brake.

11. The device as claimed in claim 1 including electric drive motors for the vehicle, circuit means for delivering a chopped current to said motors, another control means including a control relay for sensing the conductive state of a transistor for energizing said electric drive motors.

12. The device as claimed in claim 11 including means permitting the manual actuation of the disengagement of said parking brake.

13. The device as claimed in claim 12 including an accelerator pedal and a time delay circuit, said time delay circuit is adjustable for actuating the engagement of said parking brake after the action on the accelerator pedal has stopped.

* * * * *